J. Crissey,
Water Wheel.
No. 30,960.  Patented Dec. 18, 1860.
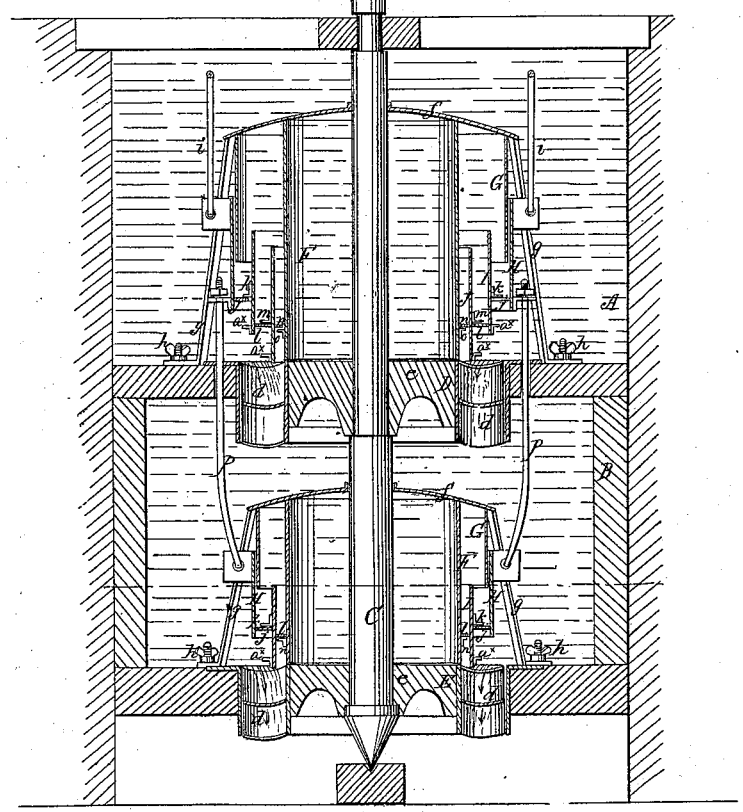
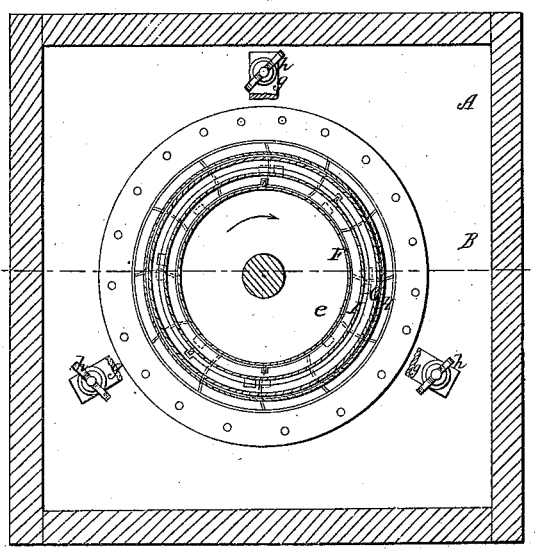
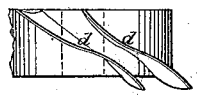
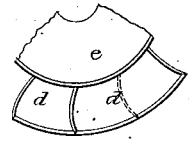
Witnesses:
Inventor:

UNITED STATES PATENT OFFICE.

JUD CRISSEY, OF CHATFIELD, MINNESOTA.

WATER-WHEEL.

Specification of Letters Patent No. 30,960, dated December 18, 1860.

*To all whom it may concern:*

Be it known that I, JUD CRISSEY, of Chatfield, in the county of Fillmore and State of Minnesota, have invented a new and Improved Water-Wheel; and I do hereby declare that the following is a full, clear, and exact description of the same, reference being had to the accompanying drawings, making a part of this specification, in which—

Figure 1, is a vertical central section of my invention taken in the line $x$, $x$, Fig. 2. Fig. 2, a horizontal section of the same taken in the line $y$, $y$, Fig. 1. Figs. 3, and 4, sectional views of one of the wheels.

Similar letters of reference indicate corresponding parts in the several figures.

This invention has for its object the regulating of the capacity of the wheel according to the power required, so that any given power less than the maximum may be obtained, with an economical expenditure of water; that is to say, a greater or less power may be obtained from one and the same wheel by a supply of water proportionate to the power required, a result which is not attained with the ordinary wheels, which depend solely on an ordinary gate to regulate the supply of water to them. In this case, the old form of gate, the wheels always require proportionately a greater volume of water when giving out a power less than the maximum, while in this invention the area of the buckets may be virtually increased or diminished and the capacity of the wheel regulated according to the power required.

To enable those skilled in the art to fully understand and construct my invention I will proceed to describe it.

A, represents a flume or pen stock in which a rectangular framing or box B, is placed, and C, is a shaft which passes vertically and centrally through the flume or penstock, said shaft being stepped at $a$, and having two wheels D, E, secured to it, the upper wheel D, being fitted in the top $b$, of the box or framing B, and the lower wheel E, fitted in the bottom $c$, of said box or framing as shown in Fig. 1.

The wheels D, E, are both formed of concave spiral buckets $d$, attached to the periphery of hubs $e$. The buckets $d$, are of spiral form longitudinally as shown in Fig. 3, and of concave form in their transverse section as shown in Figs. 3 and 4. The buckets $d$, of the upper wheel are of such a pitch that their openings are about one-fifth larger than those of the lower one, otherwise the two wheels are precisely alike. Each wheel D, E, has a hollow cylinder F, placed over its hub $e$. These cylinders have their tops $f$, projecting over their sides and concentric cylinders G, are attached to them one to each as shown clearly in Fig. 1. The cylinders F, G, are secured in proper position by supports $g$, the lower ends of which are attached to the top and bottom of the box or frame B, by bolts $h$.

On each cylinder G, there is fitted a sliding cylinder H, the upper one of which has rods $i$, attached to its periphery. These cylinders H, are allowed to slide freely on their cylinders G, and in the interior of each cylinder G, near its lower part there is a flanch $j$. These flanches project inward at right angles and come in contact with the peripheries of cylinders I, which are concentric with cylinders H, and are retained therein at a certain height by lugs $k$, which rest or bear on the flanch $j$ of cylinder H, when the latter is elevated. The upper cylinder I, is provided with a flanch $l$, which projects inward toward a cylinder J, the latter being within I, and retained at a suitable height, when I, is raised, by lugs $m$. The cylinder J, is also provided with a flanch $n$, at its inner sides, which when J, is down, rest on lugs $o$, attached to cylinder F. The lower cylinder I, has its flanch $l$, projecting toward cylinder F, which is provided with lugs $n'$, for the flanch $l$, of cylinder I, to rest on. The outer surfaces of the cylinders H, I, J, are provided with lugs $a^x$, to serve as stops or rests.

The lower cylinder H, is connected to the upper one by rods $p$, and the lower cylinder F, has but two cylinders H, I, the cylinder J, being omitted.

From the above description it will be seen that by fully elevating the upper cylinder H, the buckets of the wheels will be fully exposed, the flanches and lugs serving as connections and the full effective power of the wheels obtained, and by lowering the cylinder H, the cylinder J, of the upper wheel and then the cylinders I, H, of both wheels will successively cover the upper parts of the buckets. Thus a greater or less area of the buckets may be exposed and the capacity of the wheel regulated according to the power required. The water passes from one wheel to the other and as the upper wheel on account of the pitch of the buckets will take one fifth more water at each revolution than the lower one, the lower wheel is kept surrounded with water and both wheels are acted upon by a solid column or body of water and by having the lower wheel immersed or partially immersed in the tail race the benefits resulting from a full head of water are obtained.

Having thus described my invention what I claim as new and desire to secure by Letters Patent, is—

1. The employment or use with one or more wheels D, E, of a series of concentric gates or cylinders constructed as described and arranged relatively with the buckets $d$, to operate as, and for the purpose set forth.

2. The arrangement of two wheels D, E, fitted in a frame or box B, in a flume or penstock A, when provided on one and the same shaft C, with concentric cylinders or gates connected as shown, so that the gates of both wheels will be operated by adjusting the outer one of the upper wheel essentially as and for the purpose set forth.

JUD CRISSEY.

Witnesses:
GEO. H. HAVEN,
A. G. GILLESPIE.